US012665675B2

(12) United States Patent
Breedy

(10) Patent No.: US 12,665,675 B2
(45) Date of Patent: Jun. 23, 2026

(54) AFFECTING DATA COMMUNICATIONS OF FIBRE OPTIC PORT CONNECTIONS

(71) Applicant: DELL PRODUCTS L.P., Round Rock, TX (US)

(72) Inventor: Andrew Breedy, Cork (IE)

(73) Assignee: DELL PRODUCTS L.P., Round Rock, TX (US)

( * ) Notice: Subject to any disclaimer, the term of this patent is extended or adjusted under 35 U.S.C. 154(b) by 164 days.

(21) Appl. No.: 18/478,914

(22) Filed: Sep. 29, 2023

(65) Prior Publication Data

US 2025/0112705 A1    Apr. 3, 2025

(51) Int. Cl.
*H04B 10/60*          (2013.01)

(52) U.S. Cl.
CPC .................................... *H04B 10/60* (2013.01)

(58) Field of Classification Search
CPC .......................................... H04B 10/60–6973
See application file for complete search history.

(56) References Cited

U.S. PATENT DOCUMENTS

| 11,211,748 | B2 | 12/2021 | Breedy | |
| 11,336,469 | B2 | 5/2022 | Breedy | |
| 2008/0278794 | A1* | 11/2008 | Currie | H03B 17/00 |
| | | | | 359/279 |
| 2012/0182688 | A1* | 7/2012 | McColloch | H04B 10/40 |
| | | | | 361/692 |
| 2018/0091877 | A1* | 3/2018 | Cremin | H04Q 11/0005 |
| 2019/0033585 | A1* | 1/2019 | Xu | G02B 27/1006 |

* cited by examiner

*Primary Examiner* — Nathan M Cors
(74) *Attorney, Agent, or Firm* — BAUGH LAW, LLC

(57) ABSTRACT

Embodiments include a mechanism for disconnecting a fibre optic connection from its port without needing to physically remove the cable from the port. In one or more embodiments, a fibre optic receiver (which may be a transceiver) is flooded with light from a light emitting device (e.g., an LED source), which saturates any incoming light signals from the fibre optic cable. In one or more embodiments, the light emitting device is configured such that, once it has been activated, it cannot be deactivated via remote management—thereby providing greater security against compromised systems. In one or more embodiments, an activated light emitting device may only be deactivated manually by a reset switch. Embodiments allow for immediate interruption/blocking of connections to an information handling system (e.g., servers, switches, etc.) that may have had their security compromised.

20 Claims, 8 Drawing Sheets

100

Pluggable Connector
117

SFP Circuit Board
110

TOSA
107

ROSA with integrated Light Emitting Device
105

400

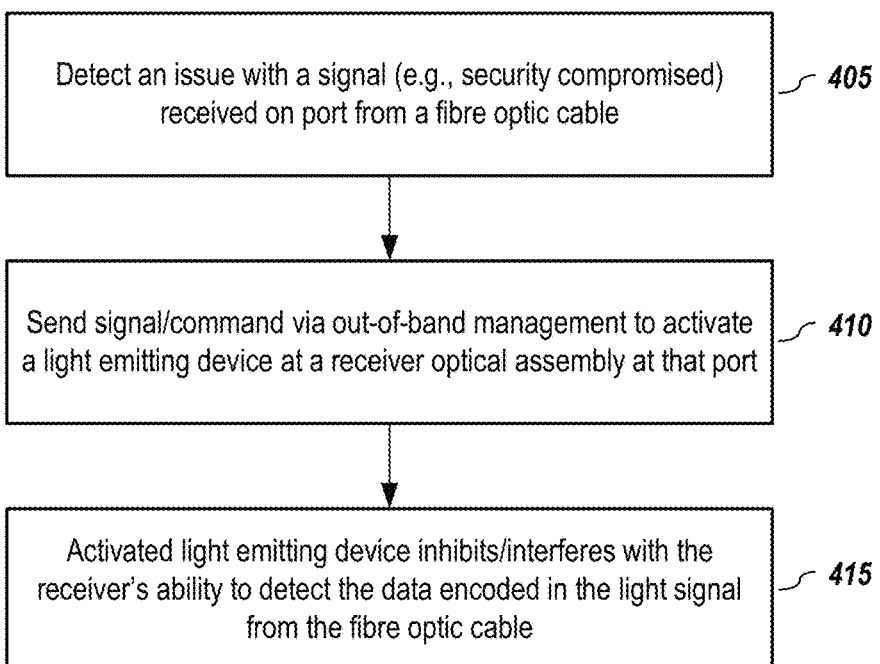

Detect an issue with a signal (e.g., security compromised) received on port from a fibre optic cable — 405

Send signal/command via out-of-band management to activate a light emitting device at a receiver optical assembly at that port — 410

Activated light emitting device inhibits/interferes with the receiver's ability to detect the data encoded in the light signal from the fibre optic cable — 415

AFFECTING DATA COMMUNICATIONS OF FIBRE OPTIC PORT CONNECTIONS

BACKGROUND

A. Technical Field

The present disclosure relates generally to information handling systems. More particularly, the present disclosure relates to handling the connectivity of a fibre optic port connection.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The expansion of networking of information handling systems has been nothing short of transformative in the modern era. Initially conceived as a means to connect information handling systems (e.g., computers) within a limited space, networking has evolved into a global phenomenon that has reshaped communication, business, and society as a whole.

This expansion began with the creation of local area networks (LANs), which allowed computers in close proximity to share resources and data. As technology advanced, wide area networks (WANs) emerged, enabling the connection of computers across larger geographical areas. The Internet, a global network of networks, has since become the cornerstone of modern networking, connecting people, devices, and information across the planet.

Moreover, the advent of cloud computing has shifted the paradigm of data storage and processing. Networking plays a vital role in connecting individuals and organizations to cloud services, enabling on-demand access to computing resources, data storage, and scalable applications.

The proliferation of networked technologies has made connectivity ubiquitous and has integrated into almost all aspects of modern life. However, networking is not without its issues. Security has become an ever-pressing concern in this expanded networking landscape, with cybersecurity measures evolving to protect against increasingly sophisticated threats. Malicious actors, such as hackers, attempt to gain access to networking systems and/or data for any of a number of nefarious reasons.

As the vastness and complexity of networking systems increases, so too does the managing and controlling of such systems. One aspect that has had notably increased complexity is dealing with compromised networks. Handling a security compromised network is a critical task that requires a swift and comprehensive response to mitigate the potential damage and prevent further breaches. Software and/or physical methods may be used in addressing such incidents.

Some of the software methods include, among others, (1) intrusion detection and (2) isolation and containment. Intrusion detection and prevention systems are programmatic (e.g., software) systems to detect and prevent unauthorized activities on the network. These systems can provide real-time alerts and responses to suspicious behavior. Once an unauthorized access has been detected, networks may have software systems to isolate the compromised systems from the rest of the network to prevent further spread of the attack. These approaches may involve segregating the affected systems or programmatically (but not physically) disconnecting them from the network entirely.

Some physical methods may also be employed to handle compromised networks. At a minimum, access is restricted to network infrastructure and systems. This typically involves restricting access to server rooms and data centers. Also employed is physically disconnecting compromised systems from the network to prevent further spread of an attack and limit an attacker's access.

Accordingly, it is highly desirable to find new and efficient ways to handle network systems, particularly if a network connection has been compromised.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts a methodology for inhibiting or blocking a fibre optic network connection, according to embodiments of the present disclosure.

DETAILED DESCRIPTION OF EMBODIMENTS

Figure 1:
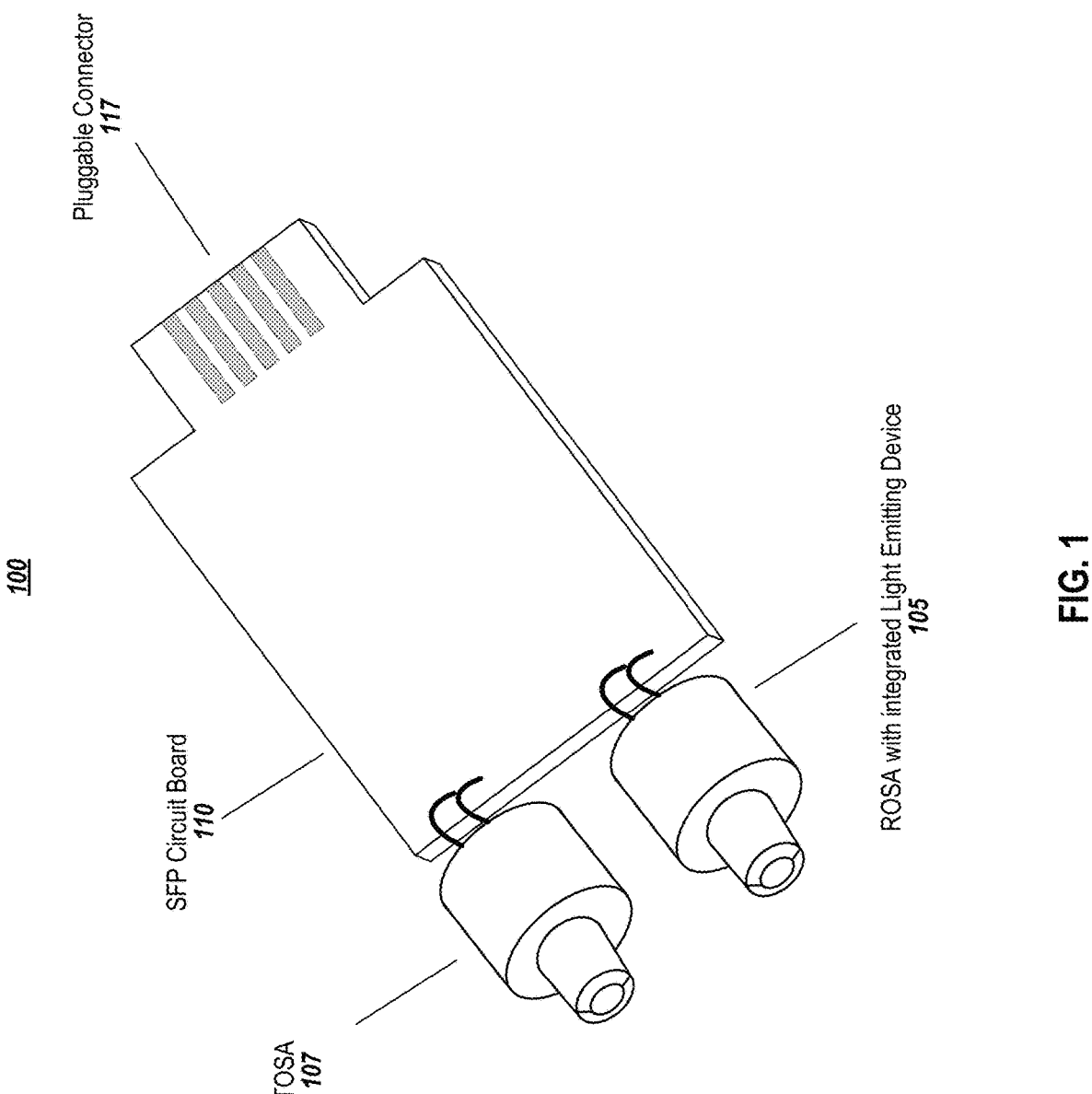
FIG. 1 ("FIG. 1") depicts a small form-factor pluggable (SFP) transceiver with an integrated light emitting device in the receiver optical subassembly (ROSA), according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of fibre optic network connections, aspects of the present disclosure are not so limited. Accordingly, the aspects of the present disclosure may be applied or adapted for use in other contexts.

A. General Overview

The proliferation of network systems has seen a corresponding, or even greater, increase in attacks. As noted above, organizations should have systems and methods to ensure they can respond effectively to security incidents.

There have been previous approaches to handling such incidents. For example, powering down servers or a rack is one method, but it is slow, one may possibly lose the state of a server, and there is a risk of the server not powering back on correctly.

Alternatively, one might shut down or disable the port on the network switch, but these approaches are done remotely. Since they can be done remotely, a malicious actor (e.g., a hacker) may be able to remotely re-enable the port on the switch.

In yet another approach, the network interface card (NIC) of the affected port may be disabled through out-of-band management. However, such approaches are not always available, tend to be slow when available, and may affect more ports than are necessary.

Manual approaches have also been used (e.g., pulling SFP interface, pulling NIC cables, etc.). However, unless a network administrator is in ready proximity of the affected port, the approach may be impractical and very slow-especially for remote locations.

In yet other approaches, embodiments of a self-isolating network cable may be used, as disclosed in commonly owed U.S. Pat. No. 11,336,469, which issued on 22 May 2022, and lists Andrew Breedy as inventor (which is incorporated by reference herein in its entirety). However, these embodiments differ in both configuration and methodologies for isolation.

In yet other approaches, embodiments of an ejecting network port may be used, as disclosed in commonly owed U.S. Pat. No. 11,211,748, which issued on 28 Dec. 2021, and lists Andrew Breedy as inventor (which is incorporated by reference herein in its entirety). However, these embodiments differ in both configuration and methodologies for isolation.

Presented herein are systems and methods that allow for handling of fibre optic connections. Embodiments create mechanisms for remotely disconnecting a fibre optic network cable from its port without physically removing the cable from the port. Embodiments involve flooding a fibre optic transceiver photodiode with light from a light emitting device (e.g., an LED (light emitting diode) or laser diode), which saturates any incoming light signals from the fibre optic cable. In one or more embodiments, the circuitry for the light emitting device may be constructed so that once it has been activated it cannot be deactivated via remote management but may only be deactivated manually by a reset switch. Alternatively, or additionally, embodiments may allow for remote deactivation.

One skilled in the art shall recognize that embodiments allow for the immediate disconnection of a single connection or entire information handling systems (e.g., servers and/or network switches) that may have had their security compromised by hacking attempts. Individual servers, network switches, or entire racks may be immediately disconnected from a network and once disconnected may be reconnected in a secure manner (e.g., by a person physically present in the data center where the compromised device is located).

Embodiments described herein are particularly relevant for companies or organizations that require high levels of security, repeatedly find themselves the target of hacking attacks, or want an extra layer of security. The ability to instantly disconnect a server, network switch, or entire datacenter racks is very useful. Information handling systems (e.g., servers, routers, switches, etc.) that are vulnerable to an outside attack or data breach can immediately be isolated from a network. Embodiments may be especially useful where there may not be immediate access to a remote data center. For example, if an organization's cyber security team is located elsewhere in the world from a compromised system, the cyber security team is able to take immediate action to remediate the situation.

B. System Embodiments

A common component of modern networking systems are small form-factor pluggable (SFP) modules. SFP modules typically are standardized, hot-swappable transceivers that are used in a variety of networking and telecommunications equipment. Its small size makes it highly adaptable, allowing network administrators to easily upgrade or replace optical interfaces without disrupting the entire network. SFPs come in various types, including optical for fiber-optic connections.

For optical-based networks, an SFP module typically includes a receiver optical subassembly (ROSA), which is a versatile and compact optical transceiver unit. The ROSA is the optical receiving component within the SFP module. ROSAs are designed to receive optical signals, convert them into electrical signals, and ultimately extract valuable data from transmitted information. ROSAs represent a sophisticated and compact optical component crucial in modern communication systems, particularly in high-speed data transmission and telecommunication networks.

A typical ROSA comprises a photodetector, optical components, and electronics carefully designed to capture incoming optical signals and convert them into electrical signals for processing. SFPs with ROSA are available in various wavelength options to accommodate different optical network configurations. This flexibility allows them to operate effectively across different optical networks.

FIG. 1 depicts a block diagram of a small form-factor pluggable (SFP) (e.g., SFP, QSFP, SFP+, etc.) transceiver, according to embodiments of the present disclosure. Depicted in FIG. 1 is a SFP 100 that comprises a ROSA 105 coupled to a SFP circuit board 110 with a pluggable connector end 115. In one or more embodiments, the ROSA 105 of the SFP 100 includes a light emitting device/light source (e.g., a light emitting diode/laser diode) integrated into the ROSA photodiode of a fibre optic transceiver that, when activated, saturates any incoming data-bearing light signals from a fibre optic cable (not depicted) that is connected to the ROSA. In one or more embodiments, the light source would come from an LED/laser diode with light emitted at the frequency(s) the receiver photodiode operates at, or a broad spectrum of light wavelengths. Thus, the light saturation of the receiver photodiode's silicon substrate effectively inhibits or blocks any incoming data transmission from the fibre optic cable from being detected, as the data-bearing light signals are lost amongst the light emitted by the light emitting device.

Also depicted in the SFP transceiver 100 of FIG. 1 is a transmitter optical subassembly (TOSA) 107. In one or more embodiments, the TOSA 107 of the SFP transceiver 100 may include a light emitting device/light source (e.g., a light emitting diode/laser diode) integrated into the TOSA 107 so that, when activated, it saturates any outgoing data-bearing light signals to a fibre optic cable (not depicted) that is connected to the TOSA.

Figure 2:
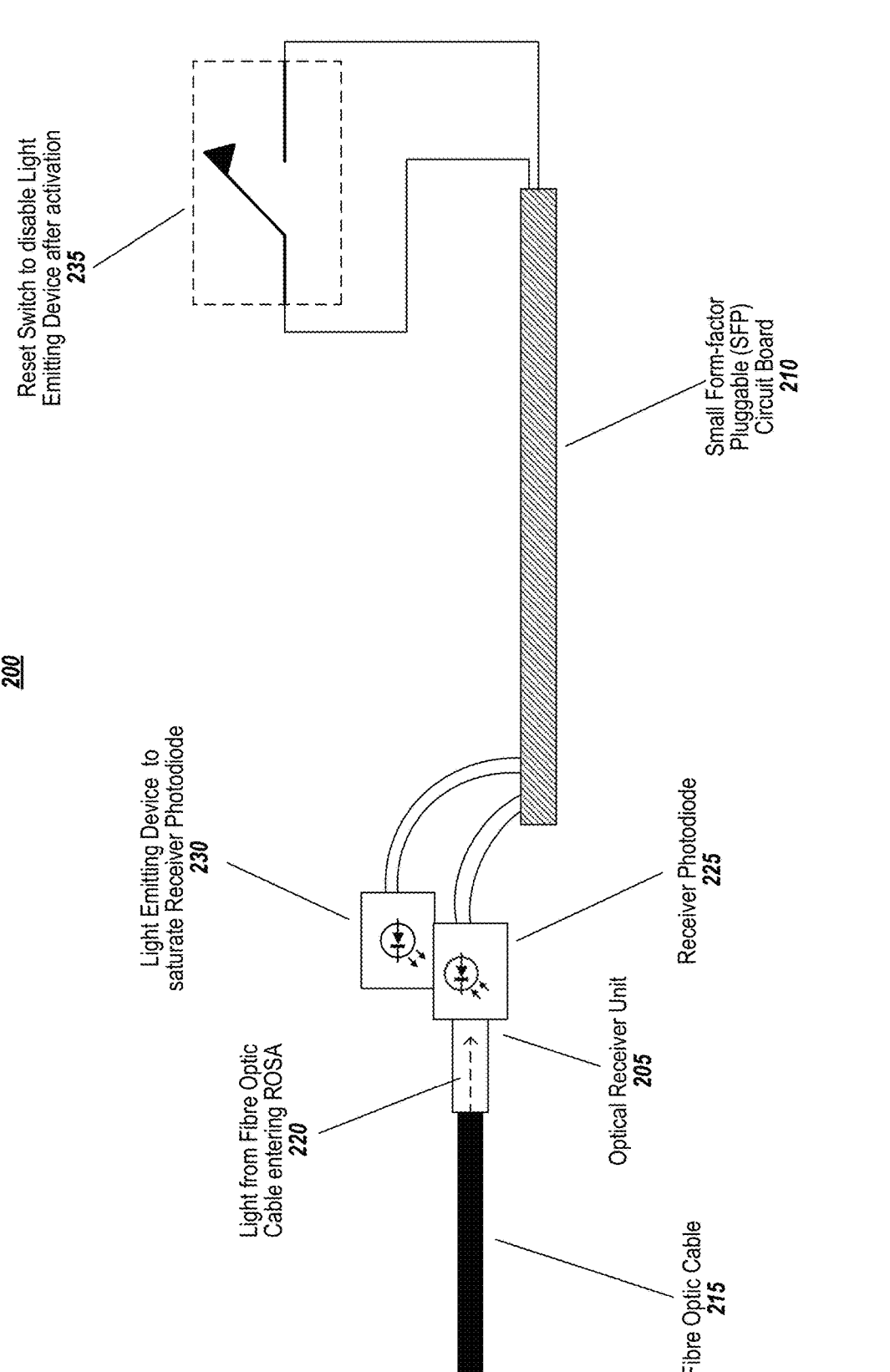
FIG. 2 depicts a fibre optic transceiver, according to embodiments of the present disclosure.

Turning now to FIG. 2, depicted is a fibre optic SFP transceiver 200, according to embodiments of the present disclosure. As illustrated in FIG. 2, a small form-factor pluggable (SFP) circuit board 210 is communicatively coupled to a receiver photodiode 225 and to a light emitting device 230. The light emitting device 230 is positioned so that, when activated, it saturates the receiver photodiode 225 thereby inhibiting detection of any data bearing light signals 220 received via the fiber optic cable 215. In one or more embodiments, the receiver photodiode 225 and the light emitting device 230 may be integrated into an optical receiver unit 205 that receives the fiber optic cable 215. In one or more embodiments, control circuitry (not depicted in FIG. 2) that controls the light emitting device 230 may be located within or at the optical receiver unit 205, on the small form pluggable circuit board 210, or a combination thereof.

In one or more embodiments, a reset switch 235 may also be communicatively coupled to the SFP circuit board 210 to reset or deactivate the light emitting device 230 after it has been activated. In one or more embodiments, the reset switch may be a physical switch (e.g., a push button switch) that requires a user to physically activate the reset button. It should be noted that the reset switch may also be a soft switch or other type of switch. Having the reset switch 235 located at or near the SFP circuit board 210 or the information handling system (not depicted) on which the SFP circuit board 210 is installed/located provides added security against remote attackers. Because information handling systems may be vulnerable to remote attacks, it is beneficial to have the countermeasure—in this case the saturating light emitting device 230—require a physical presence to deactivate. Typically, these information handling systems are in secured data centers or other secure IT locations in which physical access is limited and only granted after certain requirements have been met (e.g., door codes or keys, authentication badges, etc.). Therefore, if a remote hacker is able to compromise a network communication line (e.g., data communicated via fibre optic cable 215) and the light emitting device countermeasure 230 has been activated, the remote hacker will not be able to turn off that countermeasure and resume their nefarious actions.

Note that, while not depicted in FIG. 2, a similar system may be employed for the TOSA of the SFP transceiver module 200. It shall also be noted that SPF transceiver module 200 may employ a bi-directional optical subassembly (BOSA), which may also comprise one or more light emitting devices to effectively block the sending and/or receiving of data via a light signal or signals.

Figure 3:
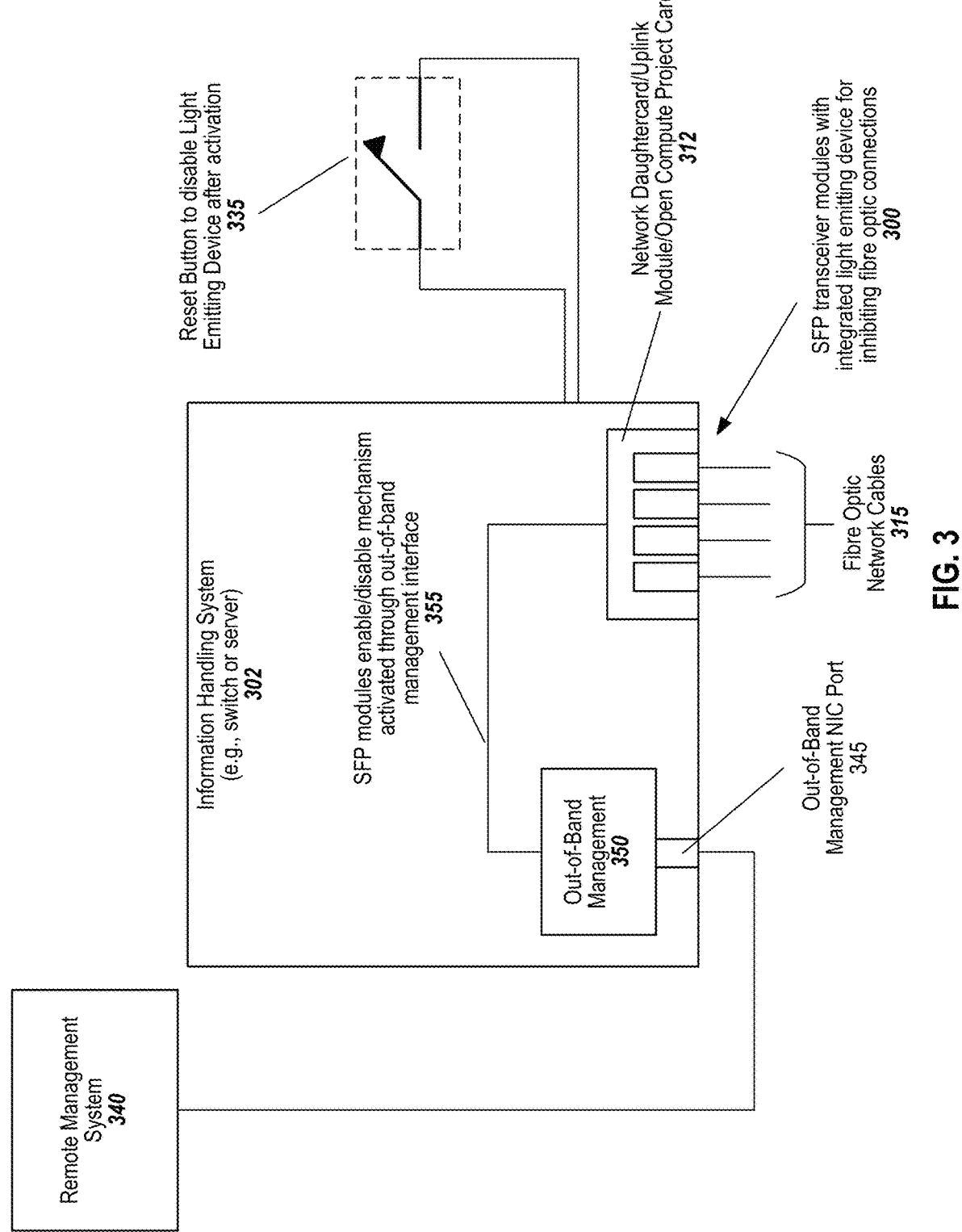
FIG. 3 depicts a fibre optic network system with a transceiver disconnect/inhibiter, according to embodiments of the present disclosure.

FIG. 3 depicts a fibre optic network system with a transceiver disconnector/inhibiter, according to embodiments of the present disclosure. In one or more embodiments, an information handling system 302 (e.g., a switch, a server, etc.) comprises a set of fiber optic network ports which are configured to receive one or more fiber optic network cables 315. Each of the network ports that receives a fiber optic cable may do so via a SFP transceiver module 300 that includes an integrated light emitting device for inhibiting data communication via a fiber optic connection. In one or more embodiments the SFP transceiver modules 300 may be connected to, or interface with, one or more additional cards 312 (e.g., a network daughtercard (NDC), an uplink module, an open compute project (OCP) card, etc.). In one or more embodiments, the light emitting device and its associated circuitry (and any associated firmware and/or software) may be integrated into the circuit board of the SFP transceiver 300 and/or into the NDC/OCP/uplink module 312.

In one or more embodiments, the cards 312 or the SFP transceiver modules 300 may be communicatively coupled 355 to an out-of-band management component or module 350. The out-of-band management controller or module 350 (e.g., an iDRAC (Integrated Dell Remote Access Controller) of Dell, Inc. of Round Rock, Texas) may interface via a management network interface card (NIC) port 345 with a remote management system 340. Via the remote management system 340 and the out-of-band management module 350, an administrator and/or an automated system may cause a signal or command to be sent to a light emitted device at a specified port to activate the light emitting device to block data received at that port. In one or more embodiments, the local out-of-band management module 350 may be configured via the management system 340 to autonomously send a signal or command to a light emitting device of a SFP transceiver responsive to detecting an issue, such as anomalous activity at a port, detected hacking, or other issues.

In one or more embodiments, in addition to being activated via the management system (e.g., system 340 and/or controller 350), the data inhibiting light emitting device may also be deactivated via the same mechanism.

However, as noted previously, there are benefits to restricting remote deactivation because a malicious actor may deactivate the data inhibiting light emitting device and continue hacking activities. Thus, in one or more embodiments, the activation circuitry may be configured so that once the data inhibiting light emitting device has been activated it cannot be deactivated from the management interface. In such embodiments, the data inhibiting light emitting device may only be deactivated via a physical reset switch 335 located on or near the information handling system 302 (e.g., on the information handling system 302, on the SFP module 300, on the NDC/Uplink module/OPC card 312, etc.). These embodiments ensure that the network interface cannot be remotely reactivated because they require the physical presence of a person inside a data center or IT room to reactivate the connection-thereby ensuring only authorized individuals can reactivate disabled/data-inhibited connections.

In one or more embodiments, the data inhibiting light emitting device may be deactivated via the remote management system 340, by the reset switch 335, or both.

It shall be noted that, in one or more embodiments, the transceiver's transmission laser diode/TOSA may also be disabled. And, as the receiver can no longer receive incoming data, it would be impossible to re-enable the transmission of data remotely.

C. Method Embodiments

FIG. 4 depicts a methodology for inhibiting or blocking a fibre optic network connection, according to embodiments of the present disclosure. In one or more embodiments, responsive to detecting (405) an issue with a signal (e.g., security has been compromised) received on a port from a fibre optic cable, a signal/command may be sent (410) via out-of-band management to activate a light emitting device at a receiver optical assembly at that port. The activated light emitting device inhibits/interferes (415) with the receiver's ability to detect the data encoded in the light signal from the fibre optic cable—in practical effect, the activated light emitting device operationally disconnects the fibre optic cable signal from the port.

Figure 5:
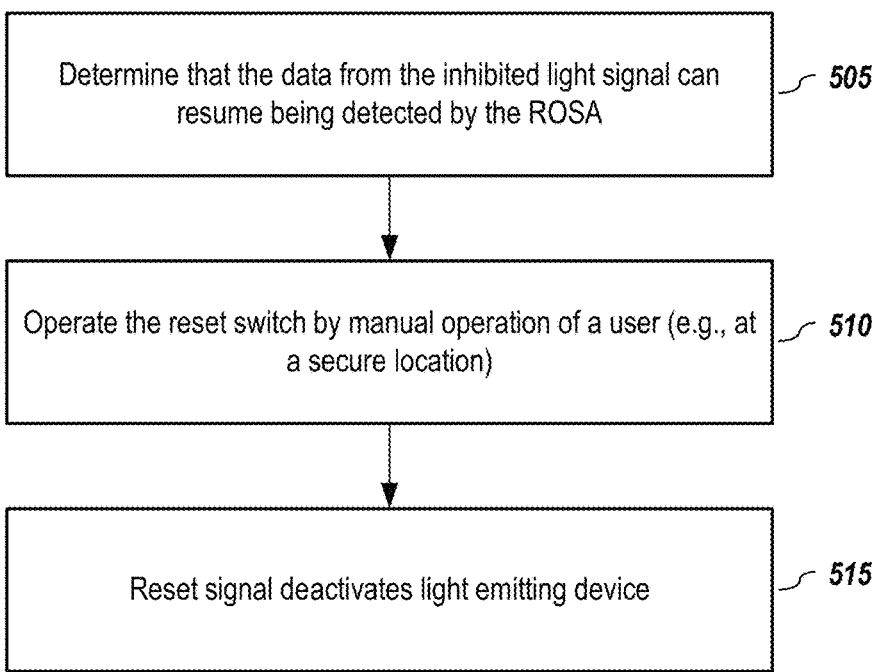
FIG. 5 depicts a methodology for deactivation of a fibre optic network connection that has been blocked, according to embodiments of the present disclosure.

FIG. 5 depicts a methodology for deactivation of a fibre optic network connection that has been blocked, according to embodiments of the present disclosure. A data signal that has been inhibited/blocked may be investigated by an administrator or other means to resolve the underlying issue. For example, a hacked device that was transmitting the signal may be fixed to resume full control to the appropriate entity. It shall be noted that other reasons beyond security concerns may exist for why a signal may be blocked. In any event, once the underlying reason for blocking the signal has been successfully resolved, data communication via that fibre optic cable may resume. Accordingly, responsive to determining (505) that the data from the inhibited light signal can resume being detected by the ROSA, the reset switch may be operated (510) by manual operation by a user (e.g., by an administrator at a secure location). Responsive to the reset switch being engaged, a reset signal causes the control circuitry to deactivate (515) the light emitting device. With the light emitting device deactivated, the data encoded in the light from the fibre optic cable can be detected by the ROSA/SFP transceiver.

Figure 6:
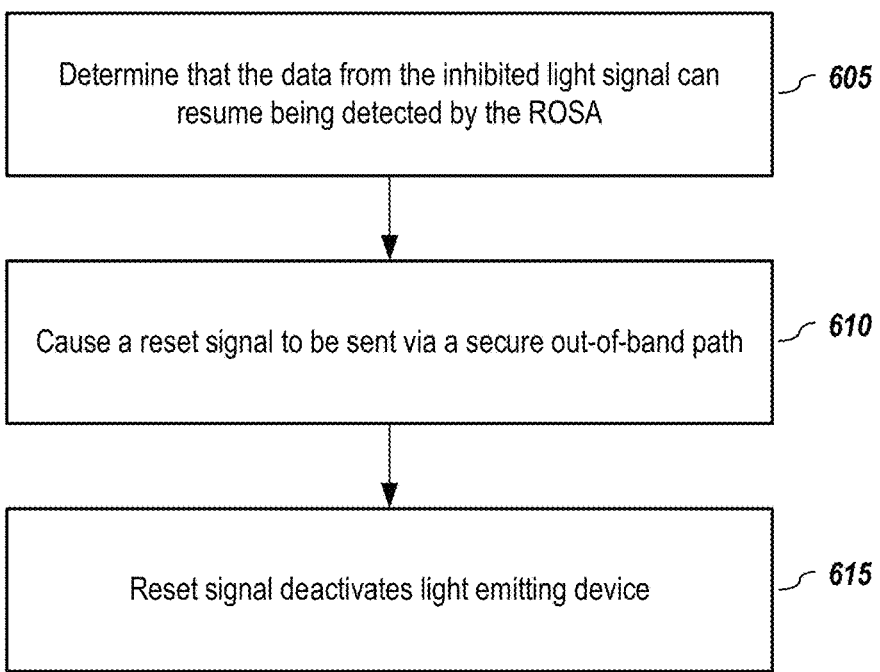
FIG. 6 depicts an alternative methodology for deactivation of a fibre optic network connection that has been blocked, according to embodiments of the present disclosure.

As noted previously, in one or more embodiments, an active light emitting device that inhibits detection of data encoded in the light from the fibre optic cable may alternatively or additionally be deactivated remotely. FIG. 6 depicts an alternative methodology for deactivation of a fibre optic network connection that has been blocked, according to embodiments of the present disclosure. In like manner as described above in FIG. 5, responsive to determining (605)

that the data from the inhibited light signal can resume being detected by the ROSA, a reset signal may be sent (610) via a secure out-of-band path to the light emitting device. Responsive to the reset signal deactivating (615) the light emitting device, the data encoded in the light from the fibre optic cable can be detected by the ROSA/SFP transceiver.

It shall be noted that these or similar methodologies may be applied to the transmitter side, in which a light emitting device saturates the fibre optic cable and makes detection of any encoded data impossible.

D. Additional Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
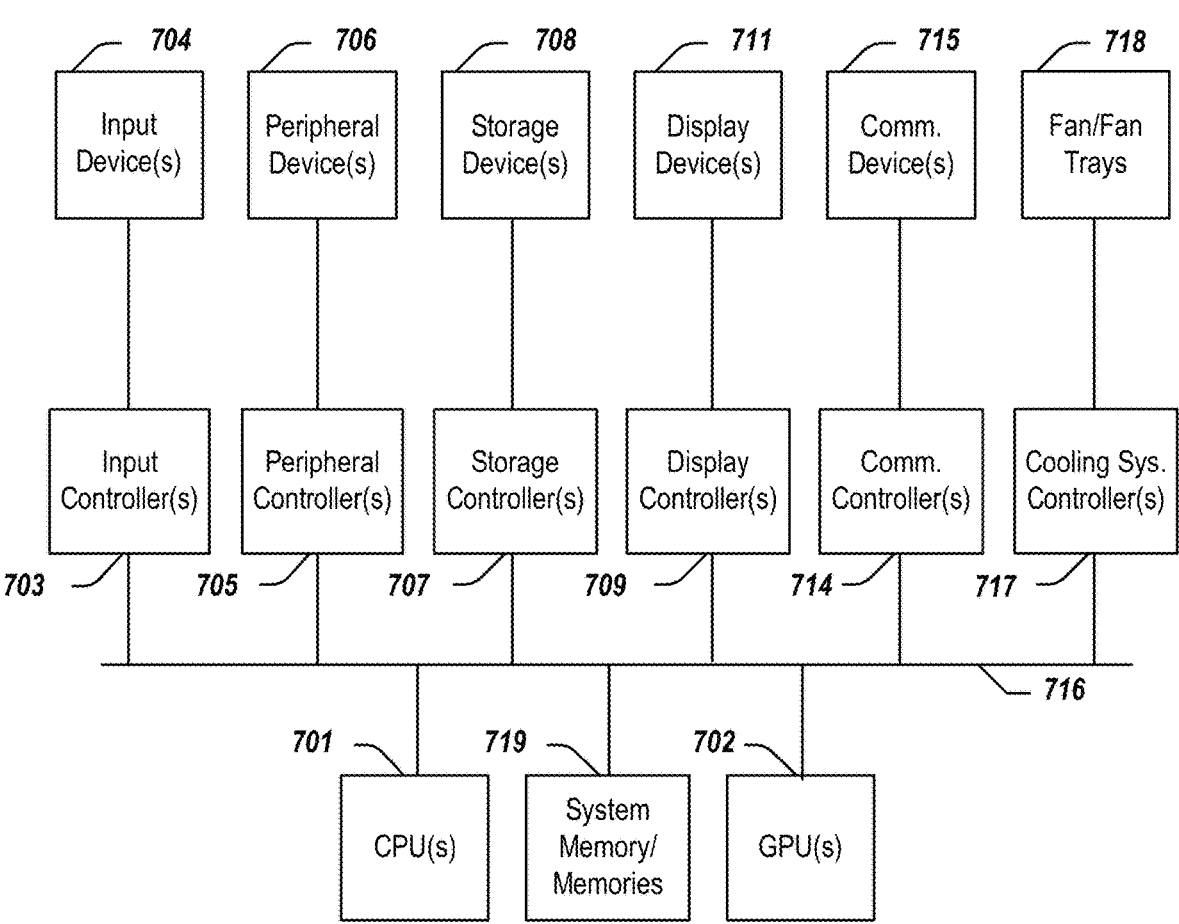
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
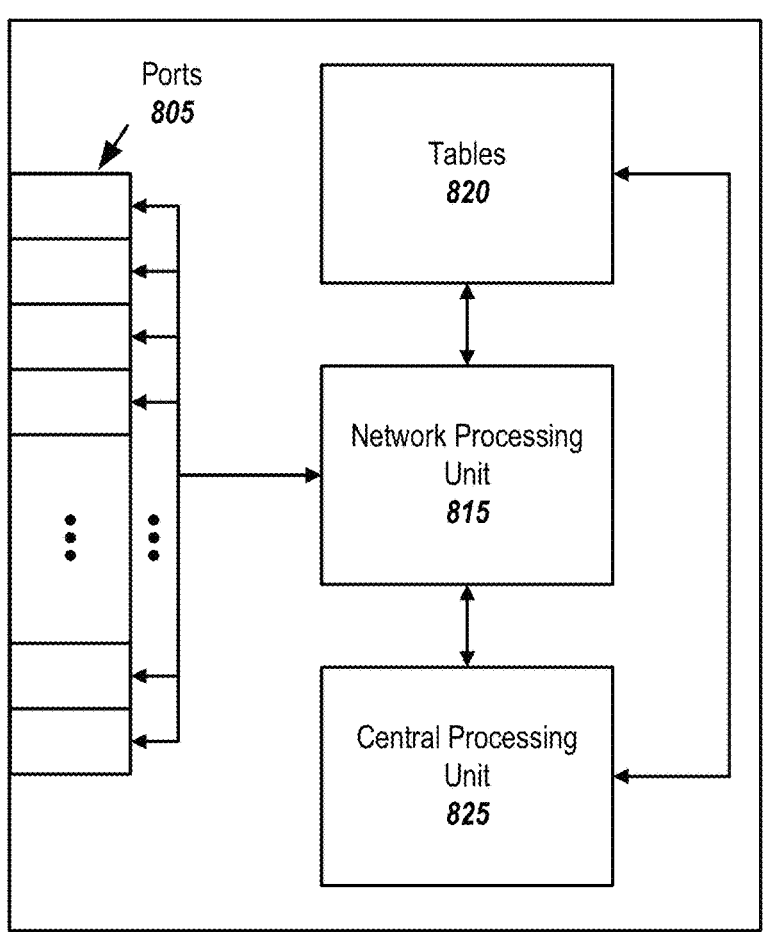
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An optical subassembly apparatus comprising:
an optical subassembly comprising an interface for receiving a fibre optic cable and a photodetector configured to receive light signal from a fibre optic cable in the interface; and
a light emitting device configured to be coupled to a controller circuitry that, when activated via the controller circuitry, emits light that saturates a receiver to interfere with the receiver's ability to detect an incoming data-bearing light signal from the fibre optic cable.

2. The optical subassembly apparatus of claim 1, wherein the light emitting device is a light emitting diode (LED) or a laser diode.

3. The optical subassembly apparatus of claim 1 further comprising:
a reset switch coupled to the controller circuitry that deactivates the light emitting device.

4. The optical subassembly apparatus of claim 3, wherein the reset switch is located at or near an information handling system that comprises the optical subassembly apparatus and the reset switch is operated by a physical action of a user.

5. The optical subassembly apparatus of claim 3, wherein the reset switch is integrated into an out-of-band management system.

6. The optical subassembly apparatus of claim 1, wherein the optical subassembly apparatus is integrated with or into a small form-factor pluggable (SFP) and the controller circuitry is located on the SFP.

7. The optical subassembly apparatus of claim 1, wherein the controller circuitry is located on a daughtercard that interfaces with the optical subassembly apparatus.

8. A method for affecting a fibre optic signal, the method comprising:
causing a light emitting device of an optical subassembly apparatus to activate, the optical subassembly apparatus comprising:
an interface for receiving a fibre optic cable and a photodetector configured to receive light signal from a fibre optic cable in the interface; and
the light emitting device configured to be coupled to a controller circuitry that, when activated via the controller circuitry, emits light that saturates a receiver to interfere with the receiver's ability to detect an incoming data-bearing light signal from the fibre optic cable.

9. The method of claim 8, wherein the light emitting device is activated after detecting an issue with data received via a signal being transmitted via the fibre optic cable.

10. The method of claim 9, wherein the light emitting device is activated:
automatically after the issue with data received via the signal was detected; or
by a user after the issue with data received via the signal was detected.

11. The method of claim 8, wherein the light emitting device is a light emitting diode (LED) or a laser diode.

12. The method of claim 8, wherein the optical subassembly apparatus further comprises:

a reset switch coupled to the controller circuitry that deactivates the light emitting device.

13. The method of claim 12 further comprising:

causing the reset switch to be operated to deactivate the light emitting device of the optical subassembly apparatus.

14. The method of claim 13, wherein the reset switch is located at or near an information handling system that comprises the optical subassembly apparatus and the reset switch is capable of being operated by a physical action of a user.

15. The method of claim 8, wherein the controller circuitry is located on a small form-factor pluggable (SFP) that interfaces with the optical subassembly apparatus or on a daughtercard that interfaces with the optical subassembly apparatus.

16. An optical component comprising:

a receiver optical subassembly (ROSA) comprising:

an interface for receiving a fibre optic cable;

a receiver configured to receive data encoded in a light signal from a fibre optic cable in the interface; and a light emitting device that, when activated via a controller circuitry, emits light that interferes with the receiver's ability to detect the data encoded in the light signal from the fibre optic cable.

17. The optical component of claim 16, wherein the light emitting device is a light emitting diode (LED) or a laser diode.

18. The optical component of claim 16 further comprising:

a reset switch coupled to the controller circuitry that deactivates the light emitting device.

19. The optical component of claim 18, wherein the reset switch is located at or near an information handling system that comprises the optical component and the reset switch is operated by a physical action of a user.

20. The optical component of claim 16, wherein the optical component is integrated with or into a small form-factor pluggable (SFP).

\* \* \* \* \*